(12) United States Patent
Akiyama

(10) Patent No.: US 10,599,025 B2
(45) Date of Patent: Mar. 24, 2020

(54) LIGHT SOURCE DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/445,286

(22) Filed: Jun. 19, 2019

(65) Prior Publication Data
US 2019/0391472 A1 Dec. 26, 2019

(30) Foreign Application Priority Data
Jun. 20, 2018 (JP) ................ 2018-116910

(51) Int. Cl.
  *G03B 21/20* (2006.01)
(52) U.S. Cl.
  CPC ......... *G03B 21/204* (2013.01); *G03B 21/208* (2013.01); *G03B 21/2066* (2013.01); *G03B 21/2073* (2013.01)
(58) Field of Classification Search
  CPC .............. G03B 21/204; G03B 21/2066; G03B 21/2073; G03B 21/208
  See application file for complete search history.

(56) References Cited

U.S. PATENT DOCUMENTS

2016/0353069 A1  12/2016 Chikahisa

FOREIGN PATENT DOCUMENTS

JP  2016-224304 A  12/2016

*Primary Examiner* — Thomas M Sember
(74) *Attorney, Agent, or Firm* — Oliff PLC

(57) ABSTRACT

A light source device includes a blue laser emitting element, a red laser emitting element, a phosphor for emitting fluorescence, a diffusely reflecting element, a polarization splitting/combining element configured to guide a first polarization component of a blue laser beam and a red laser beam to the diffusely reflecting element, and guide a second polarization component of the blue laser beam to the phosphor, a first wave plate, a light combining element, and a second wave plate. The polarization splitting/combining element splits a red first polarization component, a green component and a red second polarization component, and guides first composite light to the second wave plate, the first composite light being formed by combining the green component, the red first polarization component. The light combining element combines a part of second composite light and the red second polarization component with each other to generate illumination light.

20 Claims, 3 Drawing Sheets

LIGHT SOURCE DEVICE AND PROJECTOR

The present application is based on, and claims priority from JP Application Serial Number 2018-116910, filed Jun. 20, 2018, the disclosure of which is hereby incorporated by reference herein in its entirety.

BACKGROUND

1. Technical Field

The present disclosure relates to a light source device and a projector.

2. Related Art

In recent years, there is a technology of generating illumination light by combining a blue laser beam and fluorescence generated by excitation with the blue laser beam with each other as a light source device used for a projector. Further, in JP-A-2016-224304, there is disclosed a light source device which combines yellow fluorescence, a blue laser beam and a red laser beam with each other to generate white light.

In the light source device described above, the fluorescence is transmitted through a combining mirror and the red laser beam is reflected by the combining mirror to thereby emit the two light beams in the same direction to generate illumination light.

Here, in the case of increasing the transmittance of the combining mirror for the red component included in the fluorescence, the red laser beam transmitted through the combining mirror increases, and thus, the light loss caused in the red laser beam increases. In contrast, in the case of, for example, increasing the reflectance of the combining mirror for the red laser beam, an amount of the red component included in the fluorescence and reflected by the combining mirror increases, and thus, the light loss caused in the fluorescence increases. As described above, in the light source device described above, since the loss inevitably occurs in either of the red component of the fluorescence and the red laser beam, the light intensity of the red light becomes insufficient, and it is difficult to optimize the white balance of the white light emitted from the light source device.

SUMMARY

A light source device according to an aspect of the present disclosure includes a blue laser emitting element configured to emit a blue laser beam, a red laser emitting element configured to emit a red laser beam, a phosphor excited by the blue laser beam to generate fluorescence including a green component and a red component, a diffusely reflecting element, a polarization splitting/combining element configured to transmit or reflect a first polarization component of the blue laser beam and the red laser beam to guide the first polarization component of the blue laser beam and the red laser beam to the diffusely reflecting element, and reflect or transmit a second component of the blue laser beam to guide the second polarization component of the blue laser beam to the phosphor, a first wave plate disposed between the polarization splitting/combining element and the diffusely reflecting element, a light combining element, and a second wave plate disposed between the polarization splitting/combining element and the light combining element, wherein the polarization splitting/combining element transmits or reflects a red first polarization component having a same polarization direction as the first polarization component out of the red component and the green component, and reflects or transmits a red second polarization component having a same polarization direction as the second component out of the red component to thereby perform a split, and guides first composite light to the second wave plate, the first composite light being formed by combining the green component, the red first polarization component, the first polarization component and the red laser beam which are diffusely reflected by the diffusely reflecting element, and then transmitted through the first wave plate to thereby be converted into a different polarization direction with each other, and the light combining element combines a part of second composite light and the red second polarization component split by the polarization splitting/combining element with each other to generate illumination light, the second composite light being obtained by transmitting the first composite light through the second wave plate to thereby convert a polarization state of the first composite light into a different polarization state.

In the light source device according to the above aspect, the first wave plate may be a quarter-wave plate, and the second wave plate may be one of a half-wave plate and a quarter-wave plate.

The light source device according to the above aspect may further include a color separating mirror, and a red polarization split mirror, wherein the color separating mirror may transmit the blue laser beam and reflect the red laser beam, and the red polarization split mirror may transmit the red laser beam to guide the red laser beam to the color separating mirror, and may reflect the red second polarization component from the polarization splitting/combining element to guide the red second polarization component from the polarization splitting/combining element to the light combining element.

In the light source device according to the above aspect, the second wave plate may selectively provide a phase difference to the red laser beam and the red component included in the first composite light.

A projector according to another aspect of the present disclosure includes the light source device according to the above aspect, a light modulation device configured to modulate light from the light source device in accordance with image information to thereby form image light, and a projection optical system configured to project the image light.

DESCRIPTION OF AN EXEMPLARY EMBODIMENT

Hereinafter, an embodiment of the present disclosure will be described using the drawings.

Figure 1:
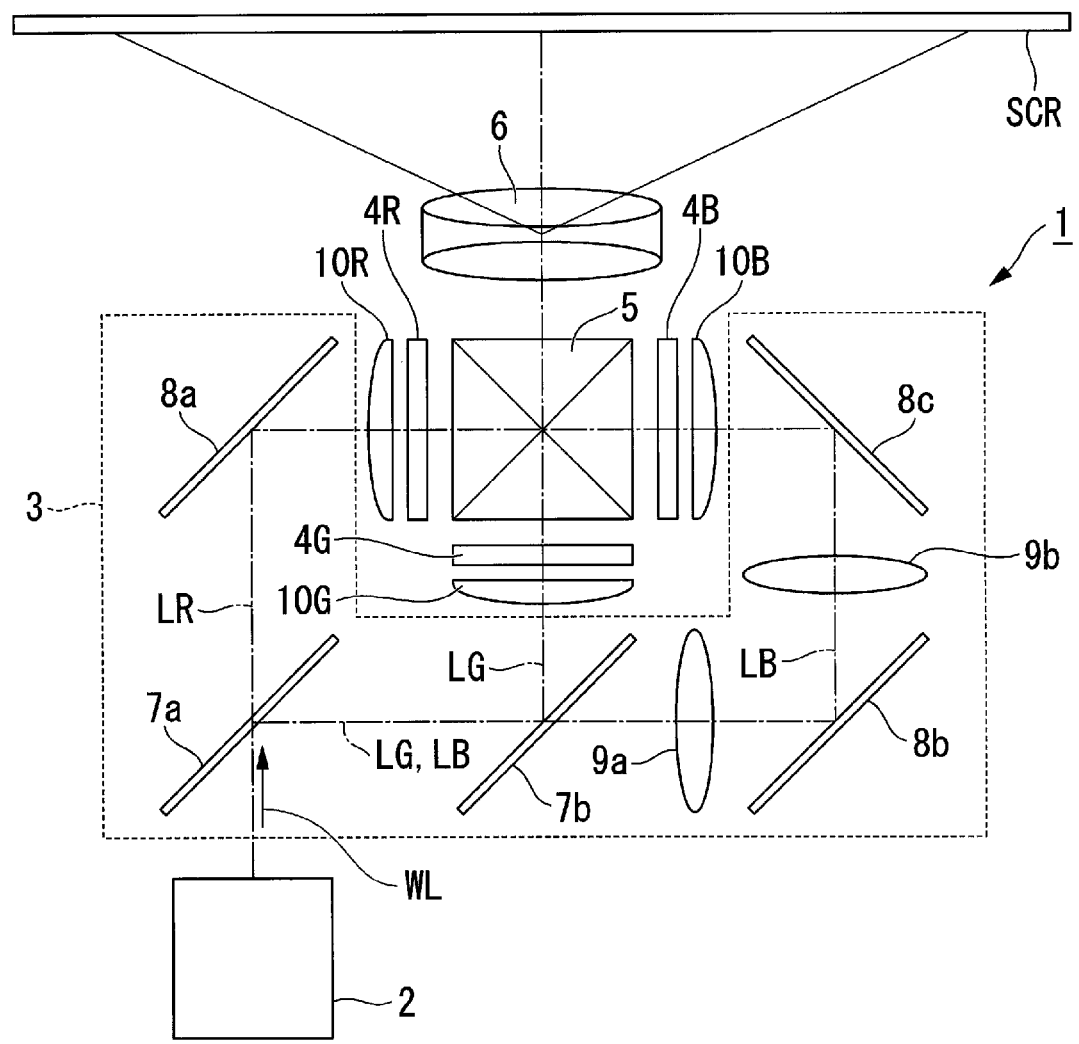
FIG. 1 is a schematic configuration diagram of a projector according to an embodiment.

FIG. 1 is a schematic configuration diagram of a projector according to the present embodiment.

As shown in FIG. 1, the projector 1 according to the present embodiment is a projection-type image display device for displaying a color image on a screen SCR. The projector 1 is provided with a light source device 2, a color separation optical system 3, a light modulation device 4R, a light modulation device 4G, a light modulation device 4B, a combining optical system 5, and a projection optical system 6.

The light source device 2 according to the present embodiment emits white illumination light WL toward the color separation optical system 3. The color separation optical system 3 separates the illumination light WL from the light source device 2 into red light LR (e.g., light in a wavelength band of 600 nm through 700 nm), green light LG (e.g., light in a wavelength band of 500 nm through 600 nm), and blue light LB (e.g., light in a wavelength band of 440 nm through 470 nm).

The color separation optical system 3 is generally provided with a first dichroic mirror 7a and a second dichroic mirror 7b, a first total reflection mirror 8a, a second total reflection mirror 8b and a third total reflection mirror 8c, and a first relay lens 9a and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the rest of the light (the green light LG and the blue light LB). Meanwhile, the second dichroic mirror 7b reflects the green light LG and at the same time transmits the blue light LB to thereby separate the rest of the light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected by the second dichroic mirror 7b toward the light modulation device 4G.

The first relay lens 9a is disposed between the second dichroic mirror 7b and the second total reflection mirror 8b in the light path of the blue light LB. The second relay lens 9b is disposed between the second total reflection mirror 8b and the third total reflection mirror 8c in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of each of the liquid crystal panels, there are respectively disposed polarization plates (not shown). Hereinafter, the light modulation device 4R, the light modulation device 4G and the light modulation device 4B are simply referred to as the light modulation devices 4R, 4G and 4B.

Further, on the incident side of the light modulation devices 4R, 4G and 4B, there are respectively disposed a field lens 10R, a field lens 10G and a field lens 10B. The field lens 10R, the field lens 10G and the field lens 10B respectively make the red light LR, the green light LG and the blue light LB entering the respective light modulation devices 4R, 4G and 4B telecentric.

The image light from each of the light modulation devices 4R, 4G and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is constituted by a projection lens group, and projects the image light combined by the combining optical system 5 toward the screen SCR in an enlarged manner. Thus, the color image enlarged is displayed on the screen SCR.

Light Source Device

Figure 2:
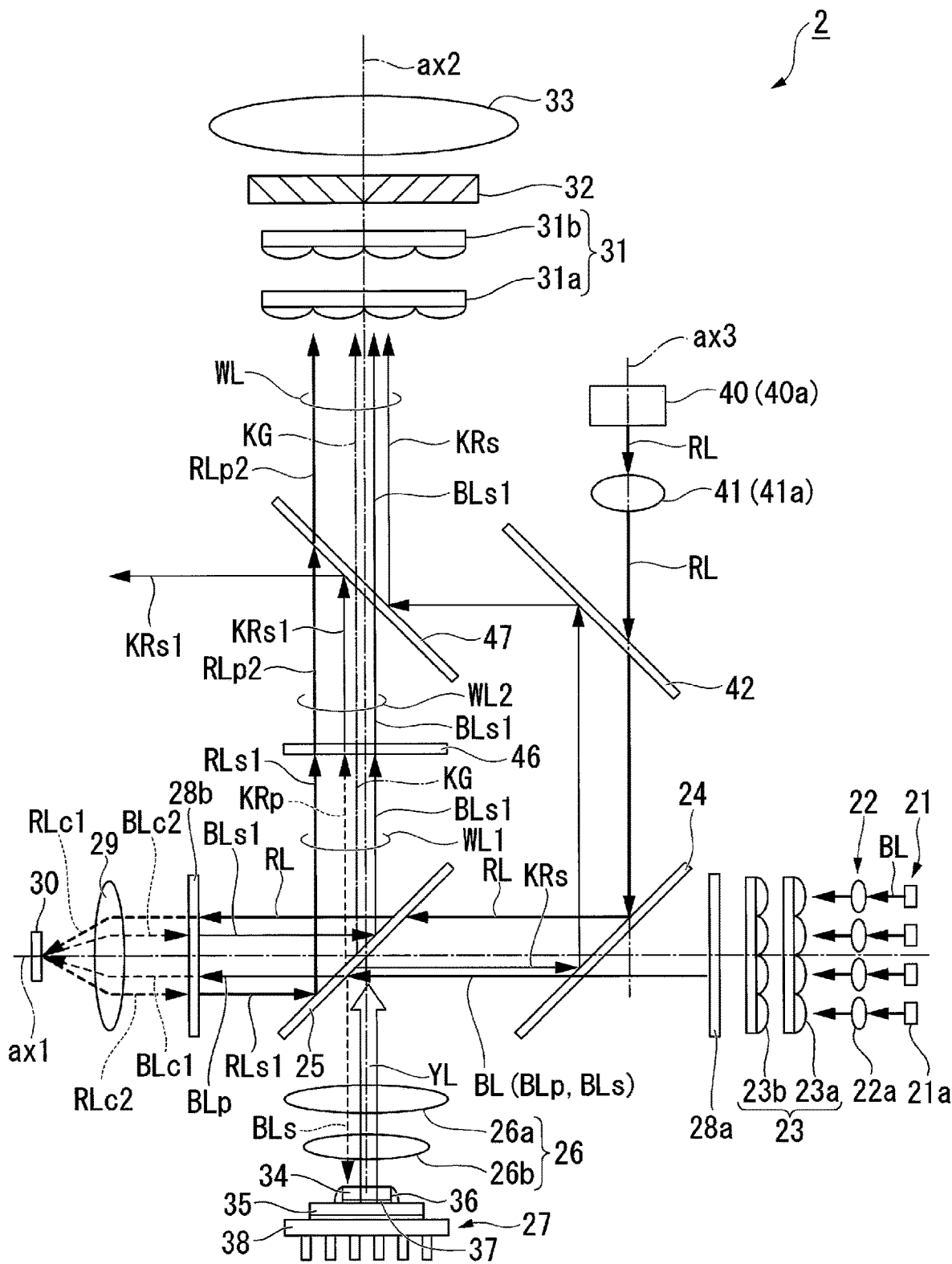
FIG. 2 is a diagram showing a schematic configuration of a light source device.

Then, the light source device 2 will be described. FIG. 2 is a diagram showing a schematic configuration of the light source device 2. As shown in FIG. 2, the light source device 2 is provided with a blue array light source 21, a first collimator optical system 22, a homogenizer optical system 23, a wave plate 28a, a dichroic mirror (a color separating mirror) 24, a polarization beam splitter (a polarization splitting/combining element) 25, a first light collection optical system 26, a fluorescence emitting element 27, a wave plate (a first wave plate) 28b, a second light collection optical system 29, a diffusely reflecting element 30, a red supplementary light source 40, a second collimator optical system 41, a red polarization split mirror 42, a wave plate (a second wave plate) 46, a light combining element 47, a lens integrator 31, a polarization conversion element 32, and a superimposing lens 33.

The blue array light source 21, the first collimator optical system 22, the homogenizer optical system 23, the wave plate 28a, the dichroic mirror 24, the polarization beam splitter 25, the wave plate 28b, the second light collection optical system 29 and the diffusely reflecting element 30 are arranged in series on a light axis ax1 of the blue array light source 21.

Further, the fluorescence emitting element 27, the first light collection optical system 26, the polarization beam splitter 25, the wave plate 46, the light combining element 47, the lens integrator 31, the polarization conversion element 32 and the superimposing lens 33 are arranged in series on an illumination light axis ax2. The light axis ax1 and the illumination light axis ax2 are located in the same plane, and are perpendicular to each other.

Further, the red supplementary light source 40, the second collimator optical system 41, the red polarization split mirror 42 and the dichroic mirror 24 are disposed in series on a light axis ax3 of the red supplementary light source 40.

The blue array light source 21 is provided with a plurality of blue laser emitting elements 21a. The plurality of blue laser emitting elements 21a is arranged in an array in a plane perpendicular to the light axis ax1. The blue laser emitting elements 21a each emit, for example, a blue light beam BL (e.g., a blue laser beam in a wavelength band of 440 nm through 470 nm).

The light beams BL emitted from the blue array light source 21 enter the first collimator optical system 22. The first collimator optical system 22 converts the light beams BL emitted from the blue array light source 21 into parallel light. The collimator optical system 22 is constituted by, for example, a plurality of collimator lenses 22a arranged in an array. The collimator lenses 22a are disposed so as to correspond respectively to the blue laser emitting elements 21a.

The light beams BL having passed through the first collimator optical system 22 enter the homogenizer optical system 23. The homogenizer optical system 23 includes multi-lenses 23a, 23b. The homogenizer optical system 23 homogenizes the illuminance distribution in an area to be illuminated (a phosphor 34) in cooperation with the first light collection optical system 26. Further, the homogenizer optical system 23 homogenizes the illuminance distribution in an area to be illuminated (the diffusely reflecting element 30) in cooperation with the second light collection optical system 29.

The light beams BL having been transmitted through the homogenizer optical system 23 enter the wave plate 28a. The wave plate 28a is, for example, a half-wave plate arranged to be able to rotate. The light beams BL emitted from the blue laser emitting elements 21a are each linearly polarized light. By appropriately setting the rotational angle of the wave plate 28a, light beams including S-polarized light and P-polarized light with respect to the polarization splitter 25 described later at a predetermined ratio can be obtained as the light beams BL transmitted through the wave plate 28a. By rotating the wave plate 28a, it is possible to change the ratio between the S-polarized light and the P-polarized light.

The light beams BL including the S-polarized light and the P-polarized light generated by passing through the wave plate 28a enter the dichroic mirror 24. The dichroic mirror 24 has a color separation function for transmitting the light beams BL regardless of the polarization state, and at the same time reflecting the red light in a different wavelength band from that of the light beams BL as blue light.

The light beams BL having been transmitted through the dichroic mirror 24 enter the polarization beam splitter 25. The polarization beam splitter 25 is disposed so as to form an angle of 45° with the light axis ax1.

The polarization beam splitter 25 has a polarization split function for splitting the light beams BL into the S-polarized light beams BLs (a second polarization component of the blue laser beams) with respect to the polarization beam splitter 25 and the P-polarized light beams BLp (a first polarization component of the blue laser beams).

In the light source device 2 according to the present embodiment, the red component of the illumination light WL is supplemented with the light emitted from the red supplementary light source 40. The red supplementary light source 40 has a plurality of red laser emitting elements 40a. The red laser emitting elements 40a each emit, for example, a red supplementary light beam RL (e.g., a red laser beam with a peak wavelength in a range of 630 nm through 650 nm). The red supplementary light beam RL is linearly polarized light. It should be noted that the number of the red laser emitting elements 40a is not particularly limited.

The red supplementary light beams RL emitted from the respective red laser emitting elements 40a enter the second collimator optical system 41. The second collimator optical system 41 converts the red supplementary light beams RL emitted from the respective red laser emitting elements 40a into parallel light. The second collimator optical system 41 is constituted by, for example, a plurality of collimator lenses 41a arranged in an array. The collimator lenses 41a are disposed so as to correspond respectively to the red laser emitting elements 40a.

The red supplementary light beams RL having been transmitted through the second collimator optical system 41 enter the red polarization split mirror 42. The red polarization split mirror 42 has a polarization split function of transmitting the P-polarized light out of the red light while reflecting the S-polarized light out of the red light. In the present embodiment, the red supplementary light beams RL emitted from the respective red laser emitting elements 40a are each P-polarized light with respect to the red polarization split mirror 42. Therefore, the red polarization split mirror 42 transmits and guides the red supplementary light beams RL to the dichroic mirror 24. Further, as described later, the red polarization split mirror 42 reflects the red light as the S-polarized light split in the polarization beam splitter from the fluorescence YL.

The red supplementary light beams RL having been transmitted through the red polarization split mirror 42 is reflected by the dichroic mirror 24 to enter the polarization beam splitter 25. The red supplementary light beams RL enter the polarization beam splitter 25 as the P-polarized light, and are then transmitted through the polarization beam splitter 25.

The light beams BLs as the S-polarized light having been reflected by the polarization beam splitter 25 enter the first light collection optical system 26. The first light collection optical system 26 converges the light beams BLs toward the phosphor 34.

In the present embodiment, the first light collection optical system 26 is constituted by, for example, a first lens 26a and a second lens 26b. The light beams BLs via the homogenizer optical system 23 and the first light collection optical system 26 enter the area to be illuminated of the fluorescence emitting element 27 in the state in which the illuminance distribution is homogenized. The fluorescence emitting element 27 has the phosphor 34, a substrate 35 for supporting the phosphor 34, and a fixation member 36 for fixing the phosphor 34 to the substrate 35.

In the present embodiment, the phosphor 34 is fixed to the substrate 35 with the fixation member 36 disposed between a side surface of the phosphor 34 and the substrate 35. The phosphor 34 has contact with the substrate 35 in a surface on an opposite side to the side which the light beams BLs enter.

The phosphor layer 34 includes a phosphor which absorbs the light beams BLs to thereby be excited. The phosphor excited by the light beams BLs emits the fluorescence YL in the wavelength band of, for example, 500 through 700 nm.

On the opposite side of the phosphor 34 to the side which the light beams BLs enter (on the opposite side to the first light collection optical system 26), there is disposed a reflecting section 37. The reflecting section 37 reflects a component proceeding toward the substrate 35 out of the fluorescence YL generated by the phosphor 34.

On a surface of the substrate 35 on the opposite side to the surface for supporting the phosphor 34, there is disposed a heatsink 38. In the fluorescence emitting element 27, since heat radiation can be achieved through the heatsink 38, the heat deterioration of the phosphor 34 can be prevented.

A part of the fluorescence YL generated by the phosphor 34 is reflected by the reflecting section 37, and is then emitted to the outside of the phosphor 34. Further, another part of the fluorescence YL generated by the phosphor 34 is emitted to the outside of the phosphor 34 without the intervention of the reflecting section 37. In such a manner as described above, the fluorescence YL is emitted from the phosphor 34.

The fluorescence YL enters the polarization beam splitter 25. The fluorescence YL is yellow light including a green fluorescence component (a green component) KG and a red fluorescence component (a red component) KR. In the present embodiment, the polarization beam splitter 25 has a polarization split function of splitting the red fluorescence component KR out of the red fluorescence YL into a red P-polarization component (a red first polarization component) KRp as P-polarized light with respect to the polarization beam splitter 25, and a red S-polarization component (a red second polarization component) KRs as S-polarized light with respect to the polarization beam splitter 25. It should be noted that the ratio between the red P-polarization component KRp and the red S-polarization component KRs with respect to the red fluorescence component KR is 50:50. Specifically, the polarization beam splitter 25 reflects the S-polarization component (the red S-polarization component KRs) and transmits the P-polarization component (the red P-polarization component KRp). Further, the polarization beam splitter 25 has a characteristic of transmitting the green fluorescence component KG out of the fluorescence YL.

The light beams BLp as the P-polarized light and the red supplementary light beams RL having been transmitted through the polarization beam splitter 25 enter the wave plate 28b. The wave plate 28b is formed of a quarter-wave plate disposed in the light path between the polarization beam splitter 25 and the diffusely reflecting element 30. Therefore, the P-polarized light beams BLp and the red supplementary light beams RL having been emitted from the polarization beam splitter 25 are converted by the wave plate 28b into, for example, blue light beams BLc1 and red supplementary light beams RLc1 as clockwise circularly polarized light, and then enter the second light collection optical system 29. The second light collection optical system 29 is formed of, for example, a single lens. The blue light beams BLc1 and the red supplementary light beams RLc1 via the homogenizer optical system 23 and the second light collection optical system 29 enter the diffusely reflecting element 30 in the state in which the illumination distribution is homogenized.

The diffusely reflecting element 30 is disposed on the opposite side to the phosphor 34 in the polarization beam splitter 25, and diffusely reflects the blue light beams BLc1 and the red supplementary light beams RLc1, which have been emitted from the second light collection optical system 29, toward the polarization beam splitter 25. As the diffusely reflecting element 30, it is preferable to use an element which causes the Lambertian reflection of the incident light, and at the same time does not disturb the polarization state.

Hereinafter, the light diffusely reflected by the diffusely reflecting element 30 is referred to as blue light beams BLc2 and the red supplementary light beams RLc2. According to the present embodiment, by diffusely reflecting the blue light beams BLc1 and the red supplementary light beams RLc1, there can be obtained the blue light beams BLc2 and the red supplementary light beams RLc2 having a roughly homogenized illuminance distribution. For example, the blue light beams BLc1 and the red supplementary light beams RLc1 as the clockwise circularly polarized light are reflected as the blue light beams BLc2 and the red supplementary light beams RLc2 as counterclockwise circularly polarized light. The blue light beams BLc2 and the red supplementary light beams RLc2 are converted by the second light collection optical system 29 into parallel light, and then enter the wave plate 28b once again.

The blue light beams BLc2 and the red supplementary light beams RLc2 as the counterclockwise circularly polarized light are converted by the wave plate 28b into the blue light beams BLs1 and the red supplementary light beams RLs1 as S-polarized light. The blue light beams BLs1 and the red supplementary light beams RLs1 as the S-polarized light are reflected by the polarization beam splitter 25 toward the wave plate 46.

The blue light beams BLs1 and the red supplementary light beams RLs1 reflected by the polarization beam splitter 25 are combined with the green fluorescence component KG and the P-polarization component (the red P-polarization component KRp) transmitted through the polarization beam splitter 25 to generate first composite light WL1. In other words, the first composite light WL1 is formed of the blue light beams BLs1, the red supplementary light beams RLs1, the green fluorescence component KG and the red P-polarization component KRp. The first composite light WL1 enters the wave plate 46.

In the present embodiment, the wave plate 46 is a half-wave plate. The wave plate 46 selectively provides a phase difference to the red P-polarization component KRp and the red supplementary light beams RLs1 included in the first composite light WL1. The red P-polarization component KRp as the P-polarized light is transmitted through the wave plate 46 to thereby be converted into a red component KRs1 as S-polarized light. Further, the red supplementary light beams RLs1 as the S-polarized light are transmitted through the wave plate 46 to thereby be converted into red supplementary light beams RLp2 as P-polarized light.

In other words, the wave plate 46 is formed of a half-wave plate with a red narrow band for selectively providing a phase difference to the light in the red wavelength band. Therefore, the wave plate 46 functions as a wave plate with respect only to the light (the red P-polarization component KRp and the red supplementary light beams RLs1) out of the first composite light WL1 transmitted through the wave plate 46.

Therefore, the first composite light WL1 is transmitted through the wave plate 46 to thereby be converted into second composite light WL2 in a different polarization state, and then enters the light combining element 47. The second composite light WL2 includes the red component KRs1 as the S-polarized light, the red supplementary light beams RLp2 as the P-polarized light, the blue light beams BLs1 and the green fluorescence component KG.

Further, the red S-polarization component KRs as the S-polarized light reflected by the polarization beam splitter to thereby be split from the fluorescence YL is reflected by the dichroic mirror 24 and then enters the red polarization split mirror 42. The red polarization split mirror 42 reflects and guides the red S-polarization component KRs as the S-polarized light to the light combining element 47.

The light combining element 47 is disposed so as to form an angle of 45° with the illumination light axis ax2. The light combining element 47 combines a part of the second composite light WL2 and the red S-polarization component KRs split by the polarization beam splitter 25 with each other to generate the illumination light WL.

More specifically, the light combining element 47 has a polarization split function of splitting a red component of the incident light into an S-polarized light beam and a P-polarized light beam with respect to the light combining element 47. Further, the light combining element 47 has a characteristic of transmitting the green fluorescence component KG and the blue component (the blue light beams BLs1) of the incident light regardless of the polarization state.

In the present embodiment, the light combining element 47 performs polarization split on the red component (the red component KRs1 as the S-polarized light and the red supplementary light beams RLp2 as the P-polarized light) of the second composite light WL2. The red supplementary light beams RLp2 as the P-polarized light are transmitted through the light combining element 47, and the red component KRs1 as the S-polarized light is reflected by the light combining element 47 and is then emitted in a different direction from that of the red supplementary light beams RLp2. It should be noted that the red supplementary light beams RLs1 reflected by the light combining element 47 are blocked by a light blocking member not shown, and are not used as the illumination light WL.

The light combining element 47 transmits the green fluorescence component KG and the blue light beams BLs1. In other words, the light combining element 47 transmits a part (the red supplementary light beams RLp2, the green fluorescence component and the blue light beams BLs1) of the second composite light WL2. Further, the light combining element 47 reflects and then emits the red S-polarization component KRs from the red polarization split mirror 42 in the same direction as the direction of the red supplementary light beams RLp2, the green fluorescence component KG and the blue light beams BLs1.

As described above, the light combining element 47 of the present embodiment combines a part (the red supplementary light beams RLp2, the green fluorescence component KG and the blue light beams BLs1) of the second composite light WL2 and the red S-polarization component KRs with each other to generate the illumination light WL. The red supplementary light beams RLp2 correspond to the total luminous flux (100%) of the red supplementary light beams RL emitted from the red supplementary light source 40, and the red S-polarization component KRs corresponds to a half (50%) of the total luminous flux in the red fluorescence component KR of the fluorescence YL.

As described above, in the light source device 2 according to the present embodiment, it is possible to use 50% of the red fluorescence component KR of the fluorescence YL as the illumination light WL, and to use 100% of the red supplementary light beams RL emitted from the red supplementary light source 40 as the illumination light WL.

The illumination light WL is emitted toward the lens integrator 31. The lens integrator 31 has a first multi-lens 31a and a second multi-lens 31b. The first multi-lens 31a has a plurality of first small lenses 31am for dividing the illumination light WL into a plurality of partial light beams.

The lens surface (the surface of the first small lenses 31am) of the first multi-lens 31a and the image formation area of each of the light modulation devices 4R, 4G and 4B are conjugated with each other. Therefore, the shape of each of the first small lenses 31am is a roughly similar shape (a rectangular shape) to the shape of each of the image formation areas of the light modulation devices 4R, 4G and 4B. Thus, each of the partial light beams emitted from the first multi-lens 31a efficiently enters each of the image formation areas of the light modulation devices 4R, 4G and 4B.

The second multi-lens 31b has a plurality of second small lenses 31bm corresponding respectively to the first small lenses 31am of the first multi-lens 31a. The second multi-lens 31b forms an image of each of the first small lenses 31am of the first multi-lens 31a in the vicinity of each of the image formation areas of the respective light modulation devices 4R, 4G and 4B in cooperation with the superimposing lens 33.

The illumination light WL having been transmitted through the lens integrator 31 enters the polarization conversion element 32. The polarization conversion element 32 is constituted by polarization split films and wave plates (half-wave plates) arranged in an array. The polarization conversion element 32 converts the polarization direction of the illumination light WL into a predetermined direction. More specifically, the polarization conversion element 32 makes the polarization direction of the illumination light WL correspond to the direction of the transmission axis of the polarization plate (not shown) disposed on the light incident side of each of the light modulation devices 4R, 4G and 4B. Thus, the polarization direction of the red light LR, the green light LG and the blue light LB obtained by splitting the illumination light WL as described above corresponds to the transmission axis direction of the incident side polarization plate of each of the light modulation devices 4R, 4G and 4B. Therefore, the red light LR, the green light LG and the blue light LB are respectively guided to the image formation areas of the light modulation devices 4R, 4G and 4B in good condition without being blocked by the incident side polarization plates, respectively.

The illumination light WL having been transmitted through the polarization conversion element 32 enters the superimposing lens 33. The superimposing lens 33 homogenizes the illuminance distribution due to the illumination light WL in the area to be illuminated in cooperation with the lens integrator 31.

As described above, according to the light source device 2 of the present embodiment, it is possible to generate the red light LR of the illumination light WL using 50% of the red fluorescence component KR of the fluorescence YL and 100% of the red supplementary light beams RL emitted from the red supplementary light source 40. Therefore, it is possible to generate the illumination light WL with the red light LR efficiently assisted.

Further, in the light source device 2 according to the present embodiment, by adjusting the output of the red supplementary light beams RL emitted from the red supplementary light source 40, it is possible to arbitrarily control the assist amount of the red component (the red light LR) of the illumination light WL. Therefore, it is possible to efficiently generate the red light LR having a desired tint.

Further, according to the light source device 2 of the present embodiment, the red fluorescence component KR (the red S-polarization component KRs) of the fluorescence YL which has been split by the polarization beam splitter 25 is reflected by the dichroic mirror 24 and the red polarization split mirror 42 to thereby be guided to the light combining element 47, and thus, it is possible to use the red S-polarization component KRs as the illumination light WL.

Further, according to the light source device 2 of the present embodiment, since there is provided the red narrow band half-wave plate for selectively providing the phase difference to the red wavelength band as the wave plate 46, it is possible to selectively provide the phase difference only to the red light (the red P-polarization component KRp and the red supplementary light beams RLs1). Thus, by converting the red laser beams (the red supplementary light beams RLs1) into the P-polarized light, it is possible to use the red laser beams as the illumination light WL in the light combining element 47.

Further, according to the projector 1 of the present embodiment, since the light source device 2 described above is provided, the light use efficiency is high, and the red light LR is sufficiently supplemented, and therefore, it becomes possible to generate the white light having the optimum white balance.

It should be noted that the present disclosure is not limited to the contents of the embodiment described above, but can arbitrarily be modified within the scope or the spirit of the present disclosure.

For example, in the embodiment described above, there is cited the case in which the wave plate 46 is the half-wave plate as an example, but the present disclosure is not limited to this example.

Figure 3:
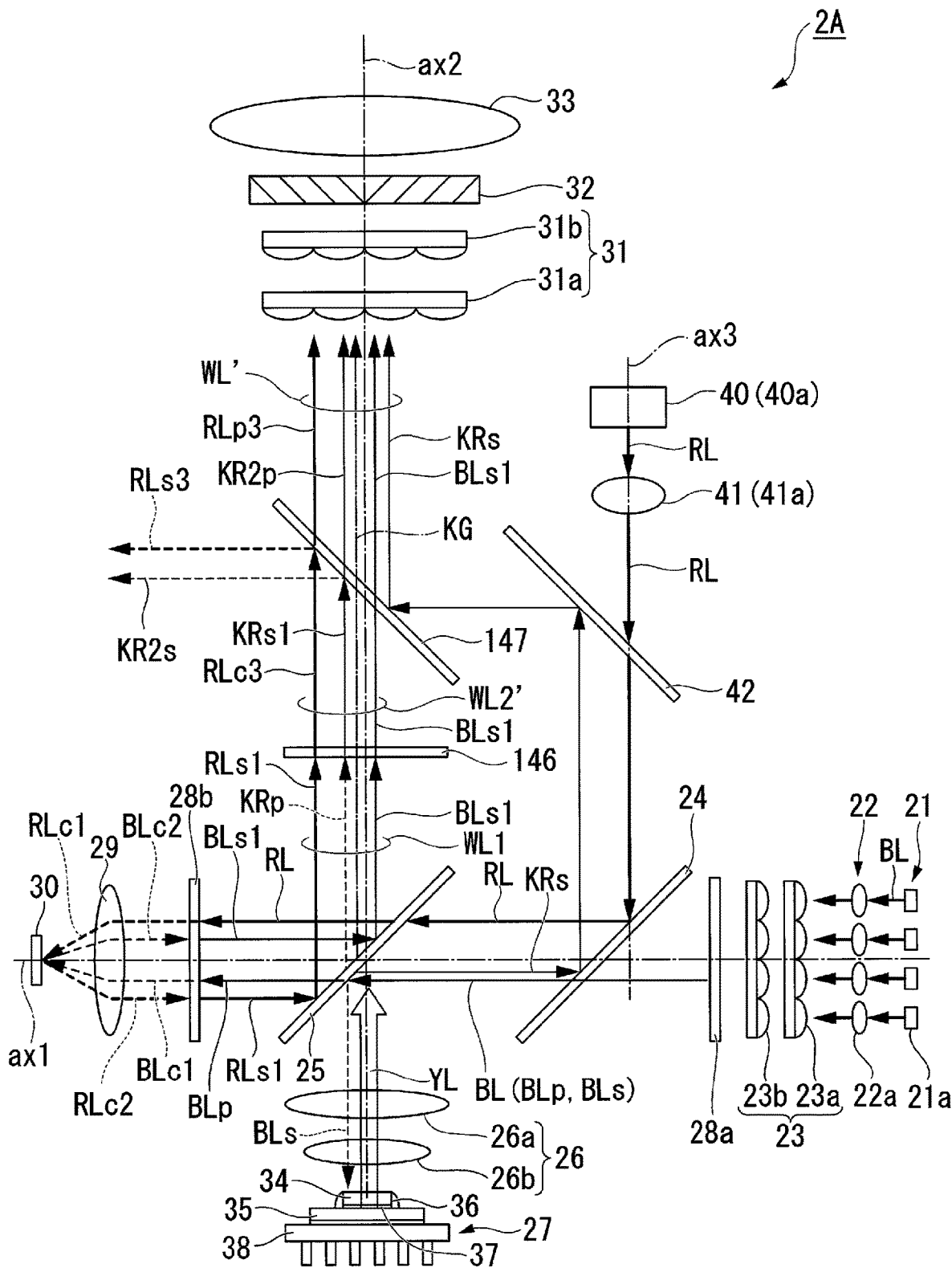
FIG. 3 is a diagram showing a configuration of an essential part of a light source device according to a modified example.

FIG. 3 is a diagram showing a configuration of an essential part of a light source device according to a modified example. As shown in FIG. 3, a wave plate 146 is a quarter-wave plate. The light source device 2A shown in FIG. 3 has the same configuration as in the embodiment described above except the point that the wave plate 146 is formed of the quarter-wave plate. Therefore, the description will hereinafter be presented with a focus on the function by the wave plate 146, and the description of the other constituents will be omitted or simplified.

The wave plate 146 is formed of the quarter-wave plate with a red narrow band for selectively providing a phase difference to that in the red wavelength band. Specifically, the wave plate 146 selectively provides a phase difference to the red P-polarization component KRp and the red supplementary light beams RLs1 included in the first composite light WL1. The red P-polarization component KRp as the P-polarized light is transmitted through the wave plate 146 to thereby be converted into a red component KR1c as, for example, clockwise circularly polarized light. Further, the red supplementary light beams RLs1 as the S-polarized light are transmitted through the wave plate 146 to thereby be converted into red supplementary light beams RLc3 as, for example, counterclockwise circularly polarized light.

Therefore, the first composite light WL1 is transmitted through the wave plate 146 to thereby be converted into second composite light WL2' in a different polarization state, and then enters a light combining element 147. The second composite light WL2' includes the red component KR1c as the clockwise circularly polarized light, the red supplementary light beams RLc3 as the counterclockwise circularly polarized light, the blue light beams BLs1 and the green fluorescence component KG.

In the present modified example, the light combining element 147 performs the polarization split on the red component of the second composite light WL2'.

The light combining element 147 splits the red component KR1c as the clockwise circularly polarized light out of the second composite light WL2' into a red component KR2p as P-polarized light and a red component KR2s as S-polarized light. Here, the ratio between the red component KR2s and the red component KR2p is 50:50, and only the red component KR2p as the P-polarized light is transmitted through the light combining element 147 to thereby be used as the illumination light as described later.

Further, the light combining element 147 splits the red supplementary light beams RLc3 as the counterclockwise circularly polarized light out of the second composite light WL2' into red supplementary light beams RLp3 as P-polarized light and red supplementary light beams RLs3 as S-polarized light. Here, the ratio between the red supplementary light beams RLp3 and the red supplementary light beams RLs3 is 50:50, and only the red supplementary light beams RLp3 as the P-polarized light are transmitted through the light combining element 147 to thereby be used as the illumination light as described later.

The red component KR2p and the red supplementary light beams RLp3 as the P-polarized light are transmitted through the light combining element 147, and at the same time, the red component KR2s and the red supplementary light beams RLs3 as the S-polarized light are reflected by the light combining element 147, and are emitted in a different direction from the direction of the red component KR2p and the red supplementary light beams RLp3. It should be noted that the red component KR2s and the red supplementary light beams RLs3 reflected by the light combining element 147 are blocked by a light blocking member not shown, and are not used as the illumination light.

The light combining element 147 of the present modified example transmits apart (the red component KR2p, the red supplementary light beams RLp3, the green fluorescence component KG and the blue light beams BLs1) of the second composite light WL2', and emits the red S-polarization component KRs from the red polarization split mirror 42 in the same direction as the direction of the part of the second composite light WL2'.

As described above, the light combining element 147 of the present modified example combines a part (the red component KR2p, the red supplementary light beams RLp3, the green fluorescence component KG and the blue light beams BLs1) of the second composite light WL2' and the red S-polarization component KRs with each other to generate the illumination light WL'. Here, the red supplementary light beams RLp3 correspond to the total luminous flux (50%) of the red supplementary light beams RL emitted from the red supplementary light source 40, the red S-polarization component KRs corresponds to a half (50%) of the total luminous flux in the red fluorescence component KR of the fluorescence YL, and the red component KR2p corresponds to a quarter (25%) of the total luminous flux in the red fluorescence component KR of the fluorescence YL.

In other words, in the light source device 2A according to the present modified example, it is possible to use 75% of the red fluorescence component KR of the fluorescence YL as the illumination light WL', and to use 50% of the red supplementary light beams RL emitted from the red supplementary light source 40 as the illumination light WL'. According to the present modified example, it is possible to generate the illumination light WL' increasing the proportion of the red fluorescence component KR formed of the fluorescence YL, and decreasing the proportion of the red supplementary light beams RL formed of the laser beams. Therefore, it is possible to generate the illumination light WL' with the red light LR efficiently assisted while reducing the speckle.

Further, in the embodiment described above, it is also possible to reverse the positions of the diffusely reflecting element 30 and the phosphor 34 with respect to the polarization beam splitter 25. Specifically, it is possible to adopt a configuration in which the light beams BLs (the second component of the blue laser beam) as S-polarized light reflected by the polarization beam splitter 25 are made to enter the diffusely reflecting element 30, and the light beams BLp (the first polarization component of the blue laser beams) as P-polarized light transmitted through the polarization beam splitter 25 are made to enter the phosphor 34 as the excitation light.

Further, although in the embodiment described above, there is described the example of installing the light source device according to the present disclosure in the projector, this is not a limitation. The light source device according to the present disclosure can also be applied to lighting equipment, a headlight of a vehicle, and so on.

What is claimed is:
1. A light source device comprising:
a blue laser emitting element configured to emit a blue laser beam;
a red laser emitting element configured to emit a red laser beam;

a phosphor excited by the blue laser beam to emit fluorescence including a green component and a red component;
a diffusely reflecting element;
a polarization splitting/combining element configured to transmit or reflect a first polarization component of the blue laser beam and the red laser beam to guide the first polarization component of the blue laser beam and the red laser beam to the diffusely reflecting element, and reflect or transmit a second polarization component of the blue laser beam to guide the second polarization component of the blue laser beam to the phosphor;
a first wave plate disposed between the polarization splitting/combining element and the diffusely reflecting element;
a light combining element; and
a second wave plate disposed between the polarization splitting/combining element and the light combining element, wherein
the polarization splitting/combining element
transmits or reflects a red first polarization component having a same polarization direction as the first polarization component out of the red component and the green component, and reflects or transmits a red second polarization component having a same polarization direction as the second polarization component out of the red component to thereby perform a split, and
guides first composite light to the second wave plate, the first composite light being formed by combining the green component, the red first polarization component, the first polarization component and the red laser beam which are diffusely reflected by the diffusely reflecting element, and then transmitted through the first wave plate to thereby be converted into a different polarization direction with each other, and
the light combining element combines a part of second composite light and the red second polarization component split by the polarization splitting/combining element with each other to generate illumination light, the second composite light being obtained by transmitting the first composite light through the second wave plate to thereby convert a polarization state of the first composite light into a different polarization state.

2. The light source device according to claim 1, wherein
the first wave plate is a quarter-wave plate, and
the second wave plate is a half-wave plate.

3. The light source device according to claim 2, further comprising:
a color separating mirror; and
a red polarization split mirror, wherein
the color separating mirror transmits the blue laser beam and reflects the red laser beam, and
the red polarization split mirror transmits the red laser beam to guide the red laser beam to the color separating mirror and reflects the red second polarization component from the polarization splitting/combining element to guide the red second polarization component from the polarization splitting/combining element to the light combining element.

4. A projector comprising:
the light source device according to claim 3;
a light modulation device configured to modulate light from the light source device in accordance with image information to thereby form image light; and
a projection optical system configured to project the image light.

5. The light source device according to claim 2, wherein
the second wave plate selectively provides a phase difference to the red laser beam and the red component included in the first composite light.

6. A projector comprising:
the light source device according to claim 5;
a light modulation device configured to modulate light from the light source device in accordance with image information to thereby form image light; and
a projection optical system configured to project the image light.

7. A projector comprising:
the light source device according to claim 2;
a light modulation device configured to modulate light from the light source device in accordance with image information to thereby form image light; and
a projection optical system configured to project the image light.

8. The light source device according to claim 1, wherein
the first wave plate is a quarter-wave plate, and
the second wave plate is a quarter-wave plate.

9. The light source device according to claim 8, further comprising:
a color separating mirror; and
a red polarization split mirror, wherein
the color separating mirror transmits the blue laser beam and reflects the red laser beam, and
the red polarization split mirror transmits the red laser beam to guide the red laser beam to the color separating mirror and reflects the red second polarization component from the polarization splitting/combining element to guide the red second polarization component from the polarization splitting/combining element to the light combining element.

10. A projector comprising:
the light source device according to claim 9;
a light modulation device configured to modulate light from the light source device in accordance with image information to thereby form image light; and
a projection optical system configured to project the image light.

11. The light source device according to claim 8, wherein
the second wave plate selectively provides a phase difference to the red laser beam and the red component included in the first composite light.

12. A projector comprising:
the light source device according to claim 11;
a light modulation device configured to modulate light from the light source device in accordance with image information to thereby form image light; and
a projection optical system configured to project the image light.

13. A projector comprising:
the light source device according to claim 8;
a light modulation device configured to modulate light from the light source device in accordance with image information to thereby form image light; and
a projection optical system configured to project the image light.

14. The light source device according to claim 1, further comprising:
a color separating mirror; and
a red polarization split mirror, wherein
the color separating mirror transmits the blue laser beam and reflects the red laser beam, and the red polarization split mirror transmits the red laser beam to guide the red laser beam to the color separating mirror and reflects the red second polarization component from the polarization splitting/combining element to guide the red second polarization component from the polarization splitting/combining element to the light combining element.

15. The light source device according to claim 14, wherein the second wave plate selectively provides a phase difference to the red laser beam and the red component included in the first composite light.

16. A projector comprising:

the light source device according to claim 15;

a light modulation device configured to modulate light from the light source device in accordance with image information to thereby form image light; and a projection optical system configured to project the image light.

17. A projector comprising:

the light source device according to claim 14;

a light modulation device configured to modulate light from the light source device in accordance with image information to thereby form image light; and a projection optical system configured to project the image light.

18. The light source device according to claim 1, wherein the second wave plate selectively provides a phase difference to the red laser beam and the red component included in the first composite light.

19. A projector comprising:

the light source device according to claim 18;

a light modulation device configured to modulate light from the light source device in accordance with image information to thereby form image light; and a projection optical system configured to project the image light.

20. A projector comprising:

the light source device according to claim 1;

a light modulation device configured to modulate light from the light source device in accordance with image information to thereby form image light; and a projection optical system configured to project the image light.

* * * * *